United States Patent [19]

Ono et al.

[11] Patent Number: 4,946,740

[45] Date of Patent: Aug. 7, 1990

[54] MAGNETIC RECORDING MEDIUM

[75] Inventors: Toshio Ono; Hiroshi Ogawa; Chiaki Mizuno; Shinji Saito, all of Kanagawa, Japan

[73] Assignee: Fuji Photo Film Co., Ltd., Kanagawa, Japan

[21] Appl. No.: 214,256

[22] Filed: Jul. 1, 1988

[30] Foreign Application Priority Data

Jul. 6, 1987 [JP] Japan .................................. 62-169329

[51] Int. Cl.$^5$ .............................................. G11B 23/00
[52] U.S. Cl. ..................................... 428/323; 427/131; 428/329; 428/408; 428/336; 428/694; 428/900
[58] Field of Search ............... 428/323, 329, 408, 694, 428/900, 336; 427/131

[56] References Cited

U.S. PATENT DOCUMENTS

| | | | |
|---|---|---|---|
| 4,259,392 | 3/1981 | Suzuki | 428/694 |
| 4,511,617 | 4/1985 | Hideyama et al. | 428/408 |
| 4,624,883 | 11/1986 | Yamaguchi et al. | 428/694 |
| 4,624,894 | 11/1986 | Kishimoto | 428/694 |
| 4,643,941 | 2/1987 | Miyoshi et al. | 428/323 |

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a non-magnetic support having thereon a first magnetic layer comprising at least about 1.0 part by weight of carbon black having an average primary particle diameter of from about 20 to 80 m$\mu$, per 100 parts by weight of magnetic particles contained in the first magnetic layer; and on the first magnetic layer, a second magnetic layer containing from about 0.1 to less than 1.0 part by weight of carbon black having an average primary particle diameter of from about 20 to 150 m$\mu$, per 100 parts by weight of magnetic particles contained in the second magnetic layer. The medium has excellent electromagnetic characteristics, running durability and heat resistance.

6 Claims, No Drawings

MAGNETIC RECORDING MEDIUM

FIELD OF THE INVENTION

The present invention relates to a magnetic recording medium, and particularly it relates to an improved magnetic recording medium having at least two magnetic layers.

BACKGROUND OF THE INVENTION

A magnetic recording medium composed of a non-magnetic support having thereon a magnetic layer containing ferromagnetic particles dispersed in a binder is generally used as a magnetic recording medium for audio recording, video recording or for computers. Audio tapes and video tapes are in many cases installed in a cassette for use.

Audio tapes installed in a cassette are generally used and stored under conditions having comparatively moderate temperature changes. However, with the development of car stereos, audio tapes have recently been used and stored in a car. When a car is parked directly in the sunshine, the temperature inside of the car becomes extraordinary high. In accordance with a testing method of car parts at a high and a low temperature (JIS-D-0204), it is reported that the maximum temperature sometimes reaches 104° C. within a car at a daytime in summer. When an audio tape with a cassette equipped with a radio is used outdoors, the tape is in many cases allowed to stand at a comparatively high temperature. Also, frequently video tape installed in a portable video tape recorder or a video camera are used outdoors and as a result those tapes are allowed to stand also at a comparatively high temperature. When the tapes are used outdoors, they are liable to be exposed to relatively dusty conditions.

When a conventional magnetic recording medium is allowed to stand at such a high temperature, the tape often shrinks and curls, with one tape edge shrinking more and as a result, the tape deforms just like an arch in the lengthwise direction, or a hub is extruded by the winding force caused by the shrinkage of a tape. When a tape deforms as described above, upon reproducing, output levels are greatly varied and reproduction is unfaithful and running cannot be continued. Particularly when a magnetic recording medium having a thin support (for example, a long-play audio compact cassette tape such as "C-80", "C-90" or "C-120", and a long-play video cassette tape is used, troubles such as an extrusion of the hub tend to occur, because the tape to be wound is very long, and is wound around a hub so many times. Also when tapes are used outdoors under dusty conditions as described above, troubles such as drop out caused by dust and contaminants are liable to occur. Therefore, more excellent heat-resistance and running durability has been required for audio tapes and video tapes.

Carbon black is conventionally contained in the magnetic layer of such a magnetic recording medium for preventing the static electrification of the magnetic layer. An average primary particle diameter of carbon black is generally from 10 to 150 mμ (milli micron). It is generally considered that when carbon black having a small particle size is used, the surface of the thus obtained magnetic layer becomes smooth, but running durability and heat resistance become poor. On the other hand, when carbon black having a large particle size is used, running durability becomes excellent but surface smoothness becomes poor, which results in undesirably deteriorating electromagnetic properties and particularly S/N in the case of a video tape. For solving the above problem, it has been proposed in Japanese Patent Publication Nos. 9041/79 and 20203/78 and Japanese Patent Application (OPI) No. 218039/83 (the term "OPI" as used herein means a "published unexamined Japanese patent application"), that carbon black having different average primary particle sizes be added in a magnetic layer when the magnetic layer is a single layer, but a magnetic recording medium having both satisfactory running durability and electromagnetic properties cannot be obtained.

On the other hand, when a magnetic layer is a multiple layer having at least two layers, a method for preparing a magnetic recording medium having excellent running durability as well as excellent electromagnetic properties is disclosed in Japanese Patent Application (OPI) No. 200425/83. That is, the magnetic layer is composed of two magnetic layers, and only the second magnetic layer (upper layer) contains carbon black to improve running durability and heat resistance. The first magnetic layer (under layer) does not contain carbon black so as to increase packing density of magnetic particles in magnetic layer, whereby electromagnetic properties are improved. However, the above described magnetic tape has such small carbon black particles (i.e., average primary particle diameter is 30 mμ) contained only in the upper layer and satisfactory running durability and heat resistance cannot yet be obtained.

Accordingly, in this material when electromagnetic characteristics are excellent, running durability is insufficient, and heat resistance is not adequate, and satisfactory performances cannot be obtained.

SUMMARY OF THE INVENTION

An object of this invention is to provide a magnetic recording medium having at least two magnetic layers and having excellent electromagnetic properties, heat resistance and running durability.

That is, this invention relates to a magnetic recording medium comprising a non-magnetic support having thereon (a) a first magnetic layer comprising at least about 1.0 part by weight of carbon black having an average primary particle diameter of from about 20 to 80 mμ, per 100 parts by weight of magnetic particles contained in the first magnetic layer, and (b) on said first magnetic layer, a second magnetic layer containing from about 0.1 to less than 1.0 part by weight of carbon black having an average primary particle diameter of from about 20 to 150 mμ, per 100 parts by weight of magnetic particles contained in the second magnetic layer.

DETAILED DESCRIPTION OF THE INVENTION

In the magnetic recording medium of this invention, heat resistance and running durability can be assured without deteriorating the surface smoothness by the first magnetic layer, and excellent electromagnetic characteristics as well as excellent surface smoothness can be assured by increasing the packing density of ferromagnetic particles in the second magnetic layer.

Accordingly, in the magnetic recording medium according to this invention, both heat resistance and running durability are excellent without deteriorating electromagnetic characteristics by the combination of the above described two layers.

The magnetic recording medium of this invention has a first magnetic layer (under layer) containing at least about 1.0 part by weight (preferably from 1.2 to 8 parts by weight) of carbon black having an average primary particle diameter of from about 20 to 80 mµ (preferably from 25 to 75 mµ) per 100 parts by weight of ferromagnetic particles contained in the magnetic layer, and a second magnetic layer (upper layer) provided thereon containing from about 0.1 to less than 1.0 part by weight (preferably from 0.2 to 0.8 part by weight) of carbon black having an average primary particle diameter of from about 20 to 150 mµ (preferably from 25 to 120 mµ) per 100 parts by weight of ferromagnetic particles.

As used herein, the term "average primary particle diameter" of carbon black refers to measurement in accordance with the following method.

Using a transmission type electron microscope of 100,000 magnifications, a photograph of carbon black is taken and particle diameters of 500 carbon black in the photograph are measured, from which an average primary particle diameter is calculated.

Since the first magnetic layer in the above described magnetic recording medium contains a relatively large amount of carbon black having comparatively fine particles, that is, an average primary particle diameter of from about 20 to 80 mµ, both heat resistance and running durability can be assured without deteriorating surface smoothness. Further, the second magnetic layer contains a smaller amount of carbon black, that is, only from about 0.1 to less than 1.0 part by weight of carbon black per 100 parts by weight of magnetic particles, and the packing density of ferromagnetic particles can be increased in proportion to the reduced amount of carbon black, thereby assuring excellent electromagnetic characteristics.

Also, the thickness of first magnetic layer is preferably from 2.0 to 5.0 µm and more preferably from 2.5 to 4.5 µm, and the thickness of second magnetic layer is preferably from 0.1 to 2.0 µm and more preferably from 0.2 to 1.8 µm.

Since shrinkage under heating is reduced by adding carbon black, both excellent heat resistance and running durability in the first magnetic layer can be assured by determining optimum particle size and content of carbon black and preferable thickness of the layers, and the second magnetic layer is selected so that the effect of the first magnetic layer is not deteriorated and electromagnetic characteritics are assured.

Accordingly, in the magnetic recording medium of this invention both excellent heat resistance and running durability can be assured without deteriorating electromagnetic characteristics by the special combination of the first and second magnetic layers.

Examples of carbon black for use in these two magnetic layers (i.e., the first and second magnetic layer) are carbon black having the above described particle diameters, such as "Asahi Thermal #35" (particle diameter 115 mµ), "Asahi Thermal #55" (particle diameter: 77 mµ), "Asahi Thermal #60" (particle diameter: 51 mµ), "Asahi Thermal #60H" (particle diameter: 35 mµ), (manufactured by Asahi Carbon Co., Ltd.); "Conductex SC" (particle diameter: 20 mµ) and "Raven 500" (particle diameter: 56 mµ), (manufactured by Columbian Carbon Co., Ltd.); "Vulcan XC-72 (Particle diameter: 30 mµ), (manufactured by Cabot Co., Ltd.); and "Dia Black" (particle diameter: 85 mµ), (manufactured by Mitsubishi Chemical Industries Ltd.).

The above-described example are carbon black of which trade names are known, and any carbon black can be used so long as such carbon black meets the requirement as to the average primary particle diameter. The above carbon black can be used in which more than one particle size is present in combination.

The weight ratio of magnetic particles and a binder contained in the first and the second magnetic layers of this invention (i.e., magnetic particles/binder) is preferably from 2.5 to 10.0, and more preferably from 3.0 to 8.0. Further, it is preferred that the difference in the weight ratio between the first magnetic layer and the second magnetic layer is 5 or less and particularly from 1 to 4.0.

The magnetic recording medium of this invention can be prepared, for example, by the following method.

After a first magnetic layer is coated on a nonmagnetic support, the magnetic layer is subjected to a magnetic orientation and calendering treatment, and then, a second magnetic layer is coated thereon and is subjected to a magnetic orientation and calendering treatment similar to the first magnetic layer to form the magnetic layers of this invention. That is, a method for preparing the magnetic recording medium of this invention is described in Japanese Patent Application (OPI) No. 27410/78.

The non-magnetic supports used in this invention are films or sheets made of polyesters such as polyethylene terephthalate (PET), or polyethylene naphthalate; polyolefins such as polypropylene; cellulose derivatives such as cellulose diacetate or cellulose triacetate; vinyl type resins such as polyvinyl chloride or polyvinylidene chloride; synthetic resins such as polycarbonate, polyamide, polyamide imide or polyimide; non-magnetic metal foils such as aluminum or copper; metal foils such as a stainless steel foil; and ceramic sheets.

The magnetic layer of the magnetic recording medium in this invention is a layer containing ferromagnetic particles dispersed in a binder. The magnetic particles used in this invention are not particularly limited. Examples of magnetic particles are conventionally known ferromagnetic particles such as $\gamma$-$Fe_2O_3$, $FeOx$ ($1.33<x<1.5$), Co-containing $\gamma$-$Fe_2O_3$, Co-containing $FeOx$ ($1.33<x<1.5$), $Fe_3O_4$, Co-containing $Fe_3O_4$, $CrO_2$, Co-Ni-P alloy, or Co-Ni alloy.

It is preferable that abrasive particles are further added in the second magnetic layer to improve the above described durability. But abrasive particles are not substantially added in the first magnetic layer in order to ensure the surface smoothness thereof. The sentence "abrasive particles are not substantially added in the first magnetic layer" means that an amount of the abrasive particles added in the first magnetic layer is preferably 0.3 part by weight or less, more preferably 0.1 part by weight or less and most preferably 0 part by weight per 100 parts by weight of the magnetic particles.

The abrasive agent is not particularly limited but these agents having a Mohs' hardness of 6 or more are preferably used and these having a Mohs' hardness of 8 or more are particularly preferred. Examples of abrasive agents are MgO (Mohs' hardness of 6), $Cr_2O_3$ (Mohs' hardness of 8.5), $\alpha$-$Al_2O_3$ (Mohs' hardness of 9), $\gamma$-$Al_2O_3$ (Mohs' hardness of from 7 to 8), SiC ($\alpha$ or $\beta$, Mohs' hardness of 9.5). Among these, $\alpha$-$Al_2O_3$ is preferred.

The particle size of the abrasive particles is preferably from 0.01 to 1.5 μm and more preferably from 0.10 to 0.80 μm. The content of the abrasive particles used in the second magnetic layer is preferably from 0.5 to 10 parts by weight and more preferably from 1 to 5 parts by weight per 100 parts by weight of magnetic particles. If desired, these abrasive particles having different kinds of particles and different particle sizes may be mixed together. The above-mentioned abrasive particles are particularly preferably used in the second magnetic layer.

The binder solution used for preparing a magnetic coating composition of this invention is a binder solution containing resin components and a solvent, and lubricating agents, etc., if desired.

The resin components used in this invention include conventionally known thermoplastic resins, thermosetting resins, reactive type resins or mixtures thereof. Examples of resin components include copolymers of the vinyl chloride type (e.g., a copolymer of vinyl chloride and vinyl acetate, a copolymer of vinyl chloride, vinyl acetate and vinyl alcohol, a copolymer of vinyl chloride, vinyl acetate and acrylic acid, a copolymer of vinyl chloride and vinylidene chloride, a copolymer of vinyl chloride and acrylonitrile, a copolymer of ethylene and vinyl acetate, and a copolymer of vinyl chloride type having therein a polar group such as —$SO_3Na$ or —$SO_2Na$ and an epoxy group); cellulose derivatives (such as cellulose resins); acrylic resins; polyvinyl acetal resins; polyvinylbutyral resins; epoxy resins; phenoxy resins; and polyurethane type resins (e.g., polyester polyurethane resins, polyurethane type resins having therein a polar group such as —$SO_3Na$ or —$SO_2Na$, and polycarbonate polyurethane resins).

When a hardening agent is used, polyisocyanate compounds are generally used. The polyisocyanate compounds are selected from polyurethane type resins, etc., generally used as a hardening agent.

When hardening treatment is conducted by electron exposure, compounds having a reactive double bond (e.g., urethane acrylate) can be used.

The examples of solvents used for preparing a magnetic coating composition include ketones such as acetone, methyl ethyl ketone, methyl isobutyl ketone, ethyl isobutyl ketone or cyclohexanone; esters such as methyl acetate, ethyl acetate, butyl acetate or monoethyl ether of glycol acetate; glycol ethers such as ether, glycol dimethyl ether or dioxane; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene. These solvents can be used alone or in combination. Of these solvents, polar solvents such as ketones or solvents containing polar solvents are particularly preferred.

Upon preparing a magnetic coating composition, magnetic particles can be uniformly mixed, kneaded and dispersed with a binder solution. Upon mixing, generally kneading and dispersing, a two-roll mill, a three-roll mill, an open kneader, a kneader under pressure or a continuous kneader may be used for pre-dispersing and then a sand grinder or a ball mill may be used for post-dispersing.

It is needles to say that additives such as lubricating agents, dispersing agents, etc., may be optionally added into the magnetic coating composition.

For coating the magnetic coating composition, an air doctor coating method, a blade coating method, a rod coating method, an extruding coating method, an air knife coating method, a squeeze coating method, an impregnating method, a reverse roll coating method, a transfer roll coating method, a gravure coating method, a kiss coating method, a cast coating method, a spray coating method or a spin coating method can be used.

The method for preparing a magnetic recording medium having two magnetic layers (upper and under layers) has been hereinbefore described, and as long as a magnetic recording medium contains two magnetic layers having the above-described characteristics, additional magnetic layers may be present to make a recording material having three or more (i.e., multiple) magnetic layers.

The present invention is illustrated more specifically by the following Examples and Comparative Examples. In each Example and Comparative Example, all parts percents, ratios and the like are by weight, unless otherwise specified.

An Example and Comparative Example for preparing a Phillips type compact casette tape are illustrated below.

EXAMPLE 1

| Coating composition for a first magnetic layer: | |
| --- | --- |
| Co-$\gamma Fe_2O_3$ (Hc: 680 Oe, BET method specific surface area: 30 $m^2/g$) | 100 parts |
| Copolymer of vinyl chloride, vinyl acetate and vinyl alcohol (component ratio: 92/3/5, degree of polymerization: 600) | 10 parts |
| Polyester polyurethane resin ("Crisvon 7209" manufactured by DAINIPPON INK AND CHEMICALS, INC.) | 7 parts |
| Lauric acid | 2.0 parts |
| Carbon black (average primary particle size: 3 0 mμ, "VULCAN XC-72" manufactured by Cabot Co., Ltd.) | 1.2 parts |
| Polyisocyanate ("Collonate L-75" manufactured by Nippon Polyurethane Co., Ltd.) | 5 parts |
| Butyl acetate | 300 parts |

| Coating composition for a second magnetic layer: | |
| --- | --- |
| Co-$\gamma Fe_2O_3$ (Hc: 720 Oe, BET method specific surface area: 30 $m^2/g$) | 100 parts |
| Copolymer of vinyl chloride, vinyl acetate and vinyl alcohol (components ratio 92/3/5, degree of polymerization: 600) | 10 parts |
| Polyester polyurethane resin ("Crisvon 7209" manufactured by DAINIPPON INK AND CHEMICALS, INC.) | 7 parts |
| Lauric acid | 2.0 parts |
| Carbon black (average primary particle size: 30 mμ, "VULCAN XC-72" manufactured by Cabot Co., Ltd) | 0.3 parts |
| α-$Al_2O_3$ (particle diameter: 0.5 μm) | 1.0 part |
| Polyisocyanate ("Collonate L-75", manufactured by Nippon Polyurethane Co., Ltd.) | 5 parts |
| Butyl acetate | 300 parts |

Regarding the above two compositions, each components except for polyisocyanate was mixed, kneaded and dispersed using a sand mill. Then, polyisocyanate was added thereto and mixed and dispersed for 20 minutes. The thus obtained dispersion was filtered using a filter having an average pore diameter of 1 μm to obtain a magnetic coating composition.

The thus obtained magnetic coating composition for a first magnetic layer was coated using a reverse roll on a polyethylene terephthalate supoprt having a thickness of 7 μm and travelling at a rate of 60 m/min., so that the dry thickness was 4 μm, and was subjected to orientation using magnets of 1500 gauss while the thus coated magnetic layer was wet, and then was dried and subjected to super calendering treatment. Thereafter, the magnetic coating composition for a second magnetic layer was coated in a dry thickness of 1.5 μm using a reverse roll, and was subjected to orientation using the above magnets while the magnetic layer was wet, and dried and subjected to super calendering treatment, and then was slit to a width of 3.81 mm and enclosed in a cassette to prepare a Phillips type compact cassette tape.

EXAMPLE 2

The same procedure as in Example 1 was repeated to prepare a Phillips type compact cassette tape except that the amount of carbon black used in the coating composition for the first magnetic layer was changed from 1.2 parts to 5.0 parts and the amount of carbon black used in the composition for the second magnetic layer was changed from 0.3 part to 0.8 part.

EXAMPLE 3

The same procedure as in Example 1 was repeated to prepare a Phillips type compact cassette tape except that 1.2 parts of carbon black used in the coating composition for the first magnetic layer was changed to 5.0 parts of Asahi Thermal #55 (average primary particle diameter: 77 mμ: manufactured by Asahi Carbon Co., Ltd.) and 0.3 part of carbon black used in the coating composition for the second magnetic layer was changed to 0.8 part of Asahi Thermal #35 (average primary particle diameter: 115 mμ, manufactured by Asahi Carbon Co., Ltd.).

COMPARATIVE EXAMPLE 1

The same procedure as in Example 1 was repeated to prepare a Phillips type compact cassette tape except that the amount of carbon black used in the coating composition for the first magnetic layer was changed from 1.2 parts to 0.8 part.

COMPARATIVE EXAMPLE 2

The same procedure as in Example 1 was repeated to prepare a Phillips type compact cassette tape except that 1.2 parts of carbon black used in the coating composition for the first magnetic layer was changed to 5.0 parts and 0.3 part of carbon black used in the coating composition for the second magnetic layer was changed to 2.0 parts.

COMPARATIVE EXAMPLE 3

The same procedure as in Example 1 was repeated to prepare a Phillips type compact cassette tape except that 1.2 parts of carbon black used in the coating composition for the first magnetic layer was changed to 0.3 part and 0.3 part of carbon black used in the coating composition for the second magnetic layer was changed to 2.0 parts.

COMPARATIVE EXAMPLE 4

The same procedure as in Example 1 was repeated to prepare a Phillips type compact cassette tape except that Asahi Thermal #35 (average primary particle diameter 115 mμ:manufactured by Asahi Carbon Co., Ltd.) was used in the coating composition for the first magnetic layer and Asahi Thermal #35 (average primary particle diameter 115 mμ: manufactured by Asahi Carbon Co., Ltd.) was used in the coating composition for the second magnetic layer.

The physical properties of the Phillips type compact cassette tapes obtained in Examples 1 to 3 and Comparative Examples 1 to 4 were evaluated in the following manner. The results are shown in Table 1.

Measuring Method:

(1) SOL 10 kHz:

Using a commercially available tape deck ("582 Type" manufactured by Nakamichi Co., Ltd.), "SOL" is shown in terms of relative values in case when the sensitivity (10 kHz) of "FR-II" manufactured by Fuji Photo Film Co., Ltd. at a high position was assumed to be 0 dB.

(2) Decrease of output:

Using a commercially available tape deck ("582 Type" manufactured by Nakamichi Co., Ltd.), signals at 1 kHz were recorded for 45 minutes length. Then, signals were reproduced by playing the recorded tape for 20 times, and output was measured each time. The decrease of output is shown by a relative value of the output measured at 20th time when the output of the first reproduction is assumed to be 0 dB.

The decrease of output was evaluated by the following three grade evaluation.

AA: Decrease of output: from 0 to 0.5 dB
BB: Decrease of output: from 0.6 to 1.0 dB
CC: Decrease of output: more than 1.0 dB (3) Running durability:

Running test of the obtained cassette tapes was carried out using 40 audio casette decks for the commercial use. After repeated run for 100 passes, the appearance of the tape which was wound (i.e., the disorder) and the existance of stop in running were observed and were evaluated by the following evaluation.

AA: The running of the all decks (i.e., 40 sample tapes) was stopped with the disorder of the tape which was wound.
BB: Though the running was not stopped, the disorder of the tape which was wound occured in 1 to 3 tapes among 40 tapes.
CC: The disorder of the tape which was wound occured in 4 to 6 tapes among 40 tapes, and the running was stopped in 1 to 2 tapes among 40 tapes.

(4) Tape deformation:

The sample cassette tapes were played 100 times using a commercially available audio cassette deck, and the state of tapes were visually observed.

AA: No tape deformation was observed.
BB: Edges of tapes were slightly stretched.
CC: Edges of tapes were stretched and became uneven (wavy).

TABLE 1

| | Carbon Black | | | | SOL 10 kHz (dB) | Decrease of Output | Running Durability* | Tape Deformation* |
|---|---|---|---|---|---|---|---|---|
| | First Layer | | Second Layer | | | | | |
| | Amount (part) | Average Primary Particle Size (mμ) | Amount (part) | Average Primary Particle Size (mμ) | | | | |
| Example 1 | 1.2 | 30 | 0.3 | 30 | 1.2 | AA | AA | AA |
| Example 2 | 5.0 | 30 | 0.8 | 30 | 1.0 | AA | AA | AA |
| Example 3 | 5.0 | 77 | 0.8 | 115 | 0.8 | AA | AA | AA |
| Example 1 | 0.8 | 30 | 0.3 | 30 | 1.2 | CC | BB | CC |
| Example 2 | 5.0 | 30 | 2.0 | 30 | −0.5 | AA | AA | AA |
| Example 3 | 0.3 | 30 | 2.0 | 30 | 0.0 | BB | BB | CC |
| Example 4 | 1.2 | 115 | 0.3 | 115 | −0.2 | AA | AA | AA |

*after a tape was allowed to stand at 100° C. 4 hours.

As is apparent from the results in Table 1, SOL, decrease of output and physical properties after heating were excellent and electromagnetic characteristics, running durability and heat resistance were also excellent in Examples 1, 2 and 3.

Regarding Comparative Examples, in Comparative Example 1 where the content of carbon black was small, SOL was good, but a large decrease of output and degraded physical properties after heating occurred, which demonstrated problems as to running durability and heat resistance. In Comparative Example 2, where the content of carbon black in the second layer was large, and in Comparative Example 4, where the particle diameter of carbon black was large in the first layer, the decrease of output and physical properties after heating were good, but a decrease of SOL was exhibited, which demonstrated problems as to electromagnetic characteristics. In Comparative Example 3, where the content of carbon black was small in the first layer (under layer) and the content of carbon black was large in the second layer, there were problems as to electromagnetic characteristics, running durability and heat resistance.

Examples and Comparative Examples for preparing a video tape are illustrated below.

| Coating composition for a first magnetic layer: | |
|---|---|
| Co-γ Fe$_2$O$_3$ (Hc: 600 Oe, BET method specific surface area: 30 m$^2$/g) | 100 parts |
| Copolymer of vinyl chloride, vinyl acetate and maleic anhydride (component ratio: 87/8/5, degree of polymerization: 600) | 10 parts |
| Polyester polyurethane resin ("Crisvon 7209" manufactured by DAINIPPON INK AND CHEMICALS, INC.) | 7 parts |
| Stearic acid | 3.0 parts |
| Butyl stearate | 1.0 part |
| Carbon black (average primary particle size: 30 mμ, "VULCAN XC-72", manufactured by Cabot Co., Ltd.) | 1.2 parts |
| Polyisocyanate ("Collonate L-75" manufactured by Nippon Polyurethane Co., Ltd.) | 5 parts |
| Butyl acetate | 300 parts |
| Coating composition for a second magnetic layer: | |
| Co-γ Fe$_2$O$_3$ (Hc: 700 Oe, BET method specific surface area: 40 m$^2$/g) | 100 parts |
| Copolymer of vinyl chloride vinyl acetate and maleic anhydride (component ratio: 87/8/5, degree of polymerization: 600) | 10 parts |
| Polyester polyurethane resin ("Crisvon 7209", manufactured by DAINIPPON INK AND CHEMICALS, INC.) | 7 parts |
| Stearic acid | 3.0 parts |
| Butyl stearate | 1.0 part |
| Carbon black (average primary particle size: 30 mμ "VULCAN XC-72", manufactured by Cabot Co., Ltd.) | 0.3 part |
| α-Al$_2$O$_3$ (average particle size 0.3 μm) | 1.0 part |
| Polyisocyanate ("Collonate L-75", manufactured by Nippon Polyurethane Co., Ltd.) | 5 parts |
| Butyl acetate | 300 parts |

Regarding the above two compositions, each component, except polyisocyanate, was mixed, kneaded and dispersed using a sand mill. Then, polyisocyanate was added thereto and mixed and dispersed for 20 minutes. The thus obtained dispersion was filtered using a filter having an average pore diameter of 1 μm to obtain a magnetic coating composition.

The thus obtained magnetic coating composition for the first magnetic layer was coated in a dry thickness of 3.0 μm using a reverse roll on a polyethylene terephthalate support having a thickness of 15 μm and travelling at a rate of 60 m/min., and was subjected to orientation using magnets of 1500 gauss while the thus coated magnetic layer was wet, and then dried and subjected to super calendering treatment. Thereafter, the magnetic coating composition for a second magnetic layer was coated in a dry thickness of 1.5 μm using a reverse roll, and was subjected to orientation using the above magnets while the magnetic layet was wet, and dried and subjected to supercalendering treatment, and then was slit to a width of ½ inch to prepare a video tape.

EXAMPLE 5

The same procedure as in Example 4 was repeated to prepare a video tape except that the amount of carbon black used in the coating composition for the first magnetic layer was changed from 1.2 parts to 5.0 parts and the amount of carbon black used in the coating composition for the second magnetic layer was changed from 0.3 part to 0.8 part.

EXAMPLE 6

The same procedure as in Example 4 was repeated to prepare a video tape except that 5.0 parts of Asahi Thermal #55 (average primary particle diameter 77 mμ, manufactured by Asahi Carbon Co., Ltd.) was used instead of 1.2 parts of carbon black used in the coating composition for the first magnetic layer, and 0.8 part of Asahi Thermal #35 (average primary particle diameter 115 mμ, manufactured by Asahi Carbon Co., Ltd.) was used instead of 0.3 part of carbon black used in the coating composition for the second magnetic layer.

COMPARATIVE EXAMPLE 5

The same procedure as in Example 4 was repeated to prepare a video tape except that the amount of carbon black used in the coating composition for the first magnetic layer was changed from 1.2 parts to 0.8 part.

COMPARATIVE EXAMPLE 6

The same procedure as in Example 4 was repeated to prepare a video tape except that the amount of carbon black used in the coating composition for the first magnetic layer was changed from 1.2 parts to 5.0 parts and the amount of carbon black used in the coating composition for the second magnetic layer was changed from 0.3 part to 2.0 parts.

COMPARATIVE EXAMPLE 7

The same procedure as in Example 4 was repeated to prepare a video tape except that the amount of carbon black used in the coating composition for the first magnetic layer was changed from 1.2 parts to 0.3 part and that for the second magnetic layer was changed from 0.3 part to 2.0 parts.

COMPARATIVE EXAMPLE 8

The same procedure as in Example 4 was repeated to prepare a video tape except that Asahi Thermal #35 (average primary particle diameter 115 mμ, manufactured by Asahi Carbon Co., Ltd.) was used in the coating composition for the first magnetic layer and the same Asahi Thermal #35 was used in the coating composition for the second magnetic layer.

The physical properties of the video tapes obtained in the above Examples 4 to 6 and Comparative Examples 5 to 8 were checked in the following manner. The results are shown in Table 2.

Measuring Method:

(1) C/N:
Reproduction characteristics were measured using a reformed VHS type video deck. Recording frequency was 4 MHz and the effective gap length of the head as used was 0.4 μm. C/N is shown in terms of relative values when C/N of VHS type video cassette tape "Super HG" manufactured by Fuji Photo Film Co., Ltd. is assumed to be 0 dB.

(2) Drop out:
Signals at 5 MHz were recorded for 10 minutes on the thus obtained video tapes at 6 m/sec. of a relative speed of a tape and a head with 60 μm of a head track width, and after the recorded signals were reproduced for 25 times, occurrences of drop out (1.5 μ sec (microsecond), −18 dB) were counted for 1 minute.

(3) Running durability:
Running test of the obtained VHS tape video deck was carried out using 40 audio cassette decks for the commercial use. After repeated run for 100 passes, the appearance of the tape which was wound (i.e., the disorder) and the existence of stop in running were observed and were evaluated by the following evaluation.
AA: The running of the all decks (i.e., 40 sample tapes) was stopped with the disorder of the tape which was wound.
BB: Though the running was not stopped, the disorder of the tape which was wound occured in 1 to 3 tapes among 40 tapes.
CC: The disorder of the tape which was wound occured in 4 to 6 tapes among 40 tapes, and the running was stopped in 1 to 2 tapes among 40 tapes.

(4) Tape deformation:
The sample cassette tapes were played 100 times using a commercially available audio cassette deck, and the state of tapes were visually observed.
AA: No tape deformation was observed.
BB: Edges of tapes were slightly stretched.
CC: Edges of tapes were stretched and become uneven (wavy).

TABLE 2

| | Carbon Black | | | | | | | |
| | First Layer | | Second Layer | | | | | |
| | Amount (part) | Average Primary Particle Size (mμ) | Amount (part) | Average Primary Particle Size (mμ) | C/N (dB) | Drop out** | Running Durability* | Tape Deformation |
| --- | --- | --- | --- | --- | --- | --- | --- | --- |
| Example 4 | 1.2 | 30 | 0.3 | 30 | 1.7 | 21 | AA | AA |
| Example 5 | 5.0 | 30 | 0.8 | 30 | 1.5 | 16 | AA | AA |
| Example 6 | 5.0 | 77 | 0.8 | 115 | 1.3 | 13 | AA | AA |
| Comparative Example 5 | 0.8 | 30 | 0.3 | 30 | 1.5 | 156 | BB | CC |
| Comparative Examples 6 | 5.0 | 30 | 2.0 | 30 | 0.0 | 8 | AA | AA |
| Comparative Examples 7 | 0.3 | 30 | 2.0 | 30 | 0.5 | 94 | BB | CC |
| Comparative Example 8 | 1.2 | 115 | 0.3 | 115 | 0.3 | 18 | AA | AA |

*after a tape was allowed to stand at 90° C. for 4 hours.
**number of occurrences per minute.

As is apparent from the results in Table 2, C/N, drop out and physical properties after heating were all excellent and electromagnetic characteristics, running durability and heat resistance were also excellent, in Examples 4, 5 and 6, according to this invention.

On the other hand, regarding the Comparative Examples, in Comparative Example 5 where the content of carbon black was small in the first layer (under layer), C/N was good, but dropouts were high and physical properties after heating were poor, which demonstrated problems as to running durability as well as heat resistance. In Comparative Example 6, where the content of carbon black was large in the second layer, and in Comparative Example 8, where carbon black had a large particle diameter in the first layer, both drop outs and physical properties after heating were good, but C/N decreased. In Comparative Example 7, where the content of carbon black was small in the first layer (under layer) and the content of carbon black was large in the second layer, there were problems as to electromagnetic characteristics, running durability and heat resistance.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon (a) a first magnetic layer comprising a resinous binder and at least about 1.0 part by weight of carbon black having an average primary particle diameter of from about 20 to 80 m$\mu$, per 100 parts by weight of magnetic particles contained in the first magnetic layer, and (b) on said first magnetic layer, a second magnetic layer containing a resinous binder and from about 0.1 to less than 1.0 part by weight of carbon black having an average primary particle diameter of from about 20 to 150 m$\mu$, per 100 parts by weight of magnetic particles contained in the second magnetic layer.

2. The magnetic recording medium as claimed in claim 1, wherein the first magnetic layer has a thickness of from 2.0 to 5.0 $\mu$m and the second layer has a thickness of from 0.1 to 2.0 $\mu$m.

3. The magnetic recording medium as claimed in claim 1, wherein said magnetic particles contained in said first magnetic layer and said second magnetic layer are selected from the group consisting of $\gamma$-Fe$_2$O$_3$, FeO$_x$, wherein $1.33<x<1.5$, Co-containing $\gamma$-Fe$_2$O$_3$, Co-containing FeO$_x$, wherein $1.33<x<1.5$, Fe$_3$O$_4$, Co-containing Fe$_3$O$_4$, CrO$_2$, a Co-Ni-P alloy and an Fe-Co-Ni alloy.

4. The magnetic recording medium as claimed in claim 1, wherein said second magnetic layer comprises from about 0.5 to 10 parts by weight of an abrasive agent per 100 parts by weight of said magnetic particles.

5. The magnetic recording medium as claimed in claim 2, wherein a weight ratio of the magnetic particles and the binder, contained in said first and said second magnetic layers is from 2.5 to 10.0, and the difference in the weight ratio between the first magnetic layer and the second magnetic layer is 5 or less.

6. The magnetic recording medium as claimed in claim 4, wherein the abrasive agent is $\alpha$-Al$_2$O$_3$.

* * * * *